(12) United States Patent
Wang et al.

(10) Patent No.: US 12,697,858 B2
(45) Date of Patent: Aug. 4, 2026

(54) GLASS ASSEMBLY

(71) Applicant: SAINT-GOBAIN GLASS FRANCE, Courbevoie (FR)

(72) Inventors: Lu Wang, Shanghai (CN); Siteng Ma, Shanghai (CN); Chong Zhou, Shanghai (CN)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 361 days.

(21) Appl. No.: 18/554,558

(22) PCT Filed: May 27, 2022

(86) PCT No.: PCT/CN2022/095409
§ 371 (c)(1),
(2) Date: Oct. 9, 2023

(87) PCT Pub. No.: WO2022/253110
PCT Pub. Date: Dec. 8, 2022

(65) Prior Publication Data
US 2024/0190221 A1 Jun. 13, 2024

(30) Foreign Application Priority Data

May 31, 2021 (CN) .......................... 202110601731.1

(51) Int. Cl.
*B60J 3/04* (2006.01)
*B60Q 3/208* (2017.01)
(52) U.S. Cl.
CPC ............... *B60J 3/04* (2013.01); *B60Q 3/208* (2017.02)
(58) Field of Classification Search
CPC ...... B60J 3/04; B60Q 3/208; B32B 17/10091;
B32B 17/10174; B32B 17/10266; B32B
17/10036; B32B 17/10293; B32B
17/10486; B32B 17/10504; B32B
17/10513; B32B 17/10532;
(Continued)

(56) References Cited

U.S. PATENT DOCUMENTS

2016/0349442 A1 12/2016 Berard et al.

FOREIGN PATENT DOCUMENTS

| CN | 104884248 A | 9/2015 |
| CN | 105291789 A | 2/2016 |
| CN | 107471978 A | 12/2017 |

(Continued)

OTHER PUBLICATIONS

International Search Report as issued in International Patent Application No. PCT/CN2022/095409, dated Aug. 29, 2022.

*Primary Examiner* — Hai H Huynh
(74) *Attorney, Agent, or Firm* — CUSHMAN PARTNERS, LLC

(57) ABSTRACT

A glass assembly includes a first glass layer including a first surface facing an exterior of a vehicle and a second surface opposite to the first surface; a second glass layer including a third surface and a fourth surface opposite to the third surface, the fourth surface facing an interior of the vehicle, and a light-adjusting layer between the first glass layer and the second glass layer, wherein the glass assembly further includes a light-emitting structure on the third surface or the fourth surface of the second glass layer, and wherein the second glass layer is used for reflecting incident light emitted by a light source and emitting the light into the interior of the vehicle through the light-emitting structure.

14 Claims, 3 Drawing Sheets

(58) Field of Classification Search
CPC ........... B32B 17/10541; G02F 2202/14; G02F
2203/48; G02F 1/1334; G03B 21/00;
G03B 21/62
USPC ...................................................... 296/97.2
See application file for complete search history.

(56) References Cited

FOREIGN PATENT DOCUMENTS

| | | | |
|---|---|---|---|
| CN | 208737131 | U | 4/2019 |
| CN | 111386194 | A | 7/2020 |
| CN | 111409330 | A | 7/2020 |
| CN | 113715727 | A | 11/2021 |
| WO | WO 2021/095650 | A1 | 5/2021 |

GLASS ASSEMBLY

CROSS-REFERENCE TO RELATED APPLICATIONS

This application is the U.S. National Stage of PCT/CN2022/095409, filed May 27, 2022, which in turn claims priority to Chinese patent application number 202110601731.1 filed May 31, 2021. The content of these applications are incorporated herein by reference in their entireties.

FIELD OF THE INVENTION

Embodiments of the present disclosure relate to glass assembly.

BACKGROUND OF THE INVENTION

Vehicle lighting system is one of the necessary systems for safe driving of vehicle. It mainly includes external lighting lamps, internal lighting lamps, external signal lamps, internal signal lamps, etc. The vehicle internal lighting system consists of dome lights, instrument lights, step lights, work lights and trunk lights, which mainly provided for convenience for drivers and passengers. Due to the function and aesthetic value of vehicle internal lighting, the vehicle lighting market is developed energetically. To some extent, such development is due to the diversity of lighting positions and functions inside the vehicle (from the roof console to the foot space). With the progress of autonomous driving technology, the vehicle internal lighting will play an increasingly important role in creating atmosphere, influencing emotion of passenger and providing entertainment.

At present, the vehicle internal lighting system usually uses light-emitting diodes as light sources to provide lighting by forming bulbs, light bands, lights and light rings. The light-emitting diodes can be integrated near the door handle, used for keyhole lighting, or steering flashing lights on rear-view mirrors, pedal lighting and cup holder lighting, etc. The shape of the lighting indication can be very simple (direct light transmission) or very complex to meet the needs of accurate lighting.

SUMMARY OF THE INVENTION

It should be understood that the summary is not intended to identify key or essential features of the embodiments of the present disclosure, nor intended to limit the scope of the present disclosure. Other features of the present disclosure will become easy to understand from the following description.

The object of the present disclosure is to provide a glass assembly with lighting and light-adjusting functions.

To this end, the technical solution of the present disclosure provides a glass assembly, which comprises a first glass layer comprising a first surface facing the exterior of a vehicle and a second surface opposite to the first surface; a second glass layer comprising a third surface and a fourth surface opposite to the third surface, the fourth surface facing the interior of the vehicle; a light-adjusting layer between the first glass layer and the second glass layer; and a light-emitting structure on the third surface or the fourth surface of the second glass layer, wherein the second glass layer is used for reflecting the incident light emitted by a light source, and emitting the light into the interior of the vehicle through the light-emitting structure.

An intermediate layer is arranged between the first glass layer and the second glass layer, and the light-adjusting layer is arranged in the intermediate layer.

The light source emits the light on the first glass layer and/or the second glass layer from the edge of the first glass layer and/or the second glass layer or vertical to the first glass layer and/or the second glass layer.

The light-adjusting layer comprises at least one of a polymer dispersed liquid crystal, a suspended particle device, an electrochromic layer, a thermochromic layer, a photochromic layer or a liquid crystal layer.

The light-adjusting layer comprises a coating layer.

The light-emitting structure comprises an ink part, a micro-structure, particles and/or a film.

The ink part has an L* value greater than 58 in the chromaticity space LAB.

The ink part comprises titanium oxide.

The first glass layer and/or the second glass layer are provided with a light source hole for receiving at least a part of the light source.

The light source hole is formed such that the light source received in the light source hole is arranged in an invisible area of the glass assembly.

It further comprises an infrared reflection layer between the first glass layer and the light-adjusting layer.

It further comprises a low radiation layer arranged on the fourth surface of the second glass layer.

It further comprises a frame structure.

It further comprises an edge-sealing material arranged at the edge of the light-adjusting layer for sealing the light-adjusting layer.

The present disclosure integrates the light-emitting function and the light-adjusting function in the structure of the glass assembly, which can adjust the external light and can also adjust the self-emitted light through the light-emitting structure.

BRIEF DESCRIPTION OF THE DRAWINGS

The above and other objects, features and advantages of the present disclosure will become more apparent by describing the exemplary embodiments of the present disclosure in more detail with reference to the accompanying drawings, in which the same reference numerals generally indicate the same components.

FIG. 1 illustrates a simplified schematic view of a glass assembly according to an embodiment of the present disclosure;

FIGS. 2-6 illustrate simplified schematic views of glass assemblies with different arrangement forms of frame layers;

Throughout the drawings, the same or similar reference numerals are used to denote the same or similar components.

DETAILED DESCRIPTION OF EMBODIMENTS

The present disclosure will now be described with reference to several exemplary embodiments. It should be understood that these embodiments are only described for the purpose of enabling those skilled in the art to better understand and realize the present disclosure, and are not intended to limit the scope of the technical solutions of the present disclosure.

As used herein, the term "including" and its variants will be interpreted as an open-ended term meaning "including but not limited to". The term "based on" will be interpreted as "based at least in part". The terms "one embodiment" and "embodiment" should be understood as "at least one embodiment". The term "another embodiment" should be understood as "at least one other embodiment". The terms "first", "second", etc. can refer to different or identical objects. Other explicit and implicit definitions may be included below. Unless the context clearly indicates otherwise, the definitions of terms are consistent throughout the specification.

The term "light-emitting structure" used in the present disclosure refers to a layer, a coating layer or a microstructure provided on a glass layer for transmitting light through the glass layer.

The glass assembly mentioned in the present disclosure can be laminated glass, which refers to a composite glass product made up of two or more pieces of glass with one or more layers of organic polymer intermediate film sandwiched therebetween. After special high-temperature preloading (or vacuumizing) and high-temperature and high-pressure process treatment, the glass and the intermediate film are permanently bonded into a whole.

Figures 1, 2, 3:
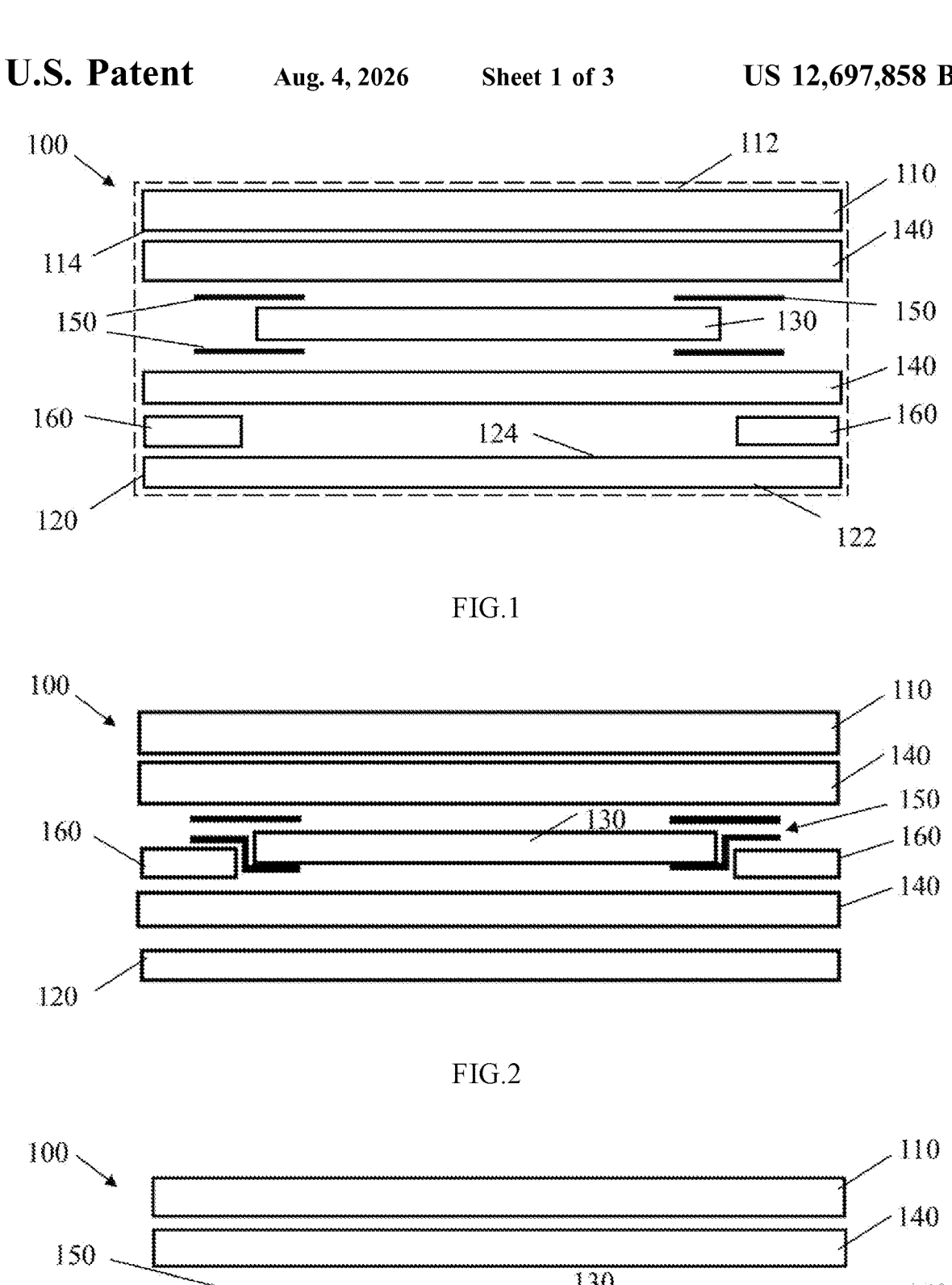

Referring to FIG. 1, in one embodiment, a laminated glass 100 includes two pieces of glass, which can be defined as a first glass layer 110 and a second glass layer 120. The first glass layer has a first surface 112 and a second surface 114. The first surface faces the exterior of the vehicle, and the second surface is opposite to the first surface, that is, the second surface faces the interior of the vehicle. The second glass layer 120 has a third surface 122 and a fourth surface 124. The fourth surface faces the interior of the vehicle, and the third surface is opposite to the fourth surface, that is, the third surface faces the exterior of the vehicle.

Similarly, in other embodiments, the laminated glass can include three pieces of glass, which can be defined as the first, second and third glass layers, respectively. Each glass layer includes two surfaces facing the exterior of the vehicle and the interior of the vehicle, respectively. For example, the first glass layer may have a first surface and a second surface, the second glass layer may have a third surface and a fourth surface, and the third glass layer may have a fifth surface and a sixth surface.

Similarly, in other embodiments, the laminated glass may include more pieces of glass, which may be defined as the first, second and $N^{th}$ glass layers in order, respectively, with N being a positive integer. Each glass layer includes a surface facing the exterior of the vehicle and a surface facing the interior of the vehicle, respectively. For example, it is defined as the first, second, . . . , $M^{th}$ surface in order, with M being a positive integer. The order can be determined as required, and in the context of this specification, the order is defined from far to near according to the distance close to the internal space of the vehicle, that is, the glass layer farthest from the internal space of the vehicle is the first glass layer, and the surface of the glass layer facing the exterior of the vehicle is similarly defined as the first surface.

Therefore, when the laminated glass includes four pieces of glass, each piece of glass is positioned as the first glass layer, the second glass layer, the third glass layer and the fourth glass layer according to the distance from the internal space of the vehicle, and each glass layer has surfaces toward the interior and exterior of the vehicle, specifically, the first glass layer has the first and second surfaces, the second glass layer has the third and fourth surfaces, the third glass layer has the fifth and sixth surfaces, and the fourth glass layer has the seventh and eighth surfaces. Here, the odd-numbered surface is defined as the surface facing the exterior of the vehicle, and the even-numbered surface is defined as the surface facing the interior of the vehicle.

With continued reference to FIG. 1, in this embodiment, the glass 100 further includes a light-adjusting layer 130 disposed between the first glass layer and the second glass layer. The light-adjusting layer 130 may be a polymer dispersed liquid crystal (PDLC), a suspended particle device (SPD), an electrochromic layer, a thermochromic layer, a photochromic layer or a liquid crystal layer. The light-adjusting layer 130 can also be any other structure or material that can adjust the light transmission amount, as long as the light flux or other optical parameters can be changed according to the environment or control conditions.

The light-adjusting layer 130 is disposed in the intermediate layer between the two glass layers. Referring to FIG. 1, the intermediate layer is generally formed by two adhesive layers 140. Specifically, in one example, the intermediate layer may be formed of two PVB material layers, and the light-adjusting layer 130 is placed between the two PVB layers in the process of processing, and the two PVB materials are fused after heating to wrap the light-adjusting layer 130 therein. The adhesive layer can be PVB, EVA, POE or other adhesive materials, and its light transmittance can be high or low.

In some embodiments, an edge-sealing material 150 is provided on the edge of the light-adjusting layer 130 to block the light-adjusting layer 130 and the adhesive layer 140, thereby preventing the light-adjusting layer material from reacting with the adhesive layer material. The edge-sealing material 150 can be PET or other flexible materials. In other embodiments, when the adhesive layer material does not react with the light-adjusting layer material, for example, when the adhesive layer material is PVB layer, the edge-sealing material may not be provided.

In addition, in order to fill the gap between the layers, a frame layer 160, which may be a PET material layer, is provided on the exterior of the light-adjusting layer. The frame layer 160 occupies the area of the whole glass 100 except the light-adjusting layer 140, thereby keeping the thickness of the whole glass 100 uniform. In the embodiment shown in FIG. 1, the frame layer 160 is disposed between the adhesive layer 140 and the second glass layer 120.

Figures 4, 5, 6:
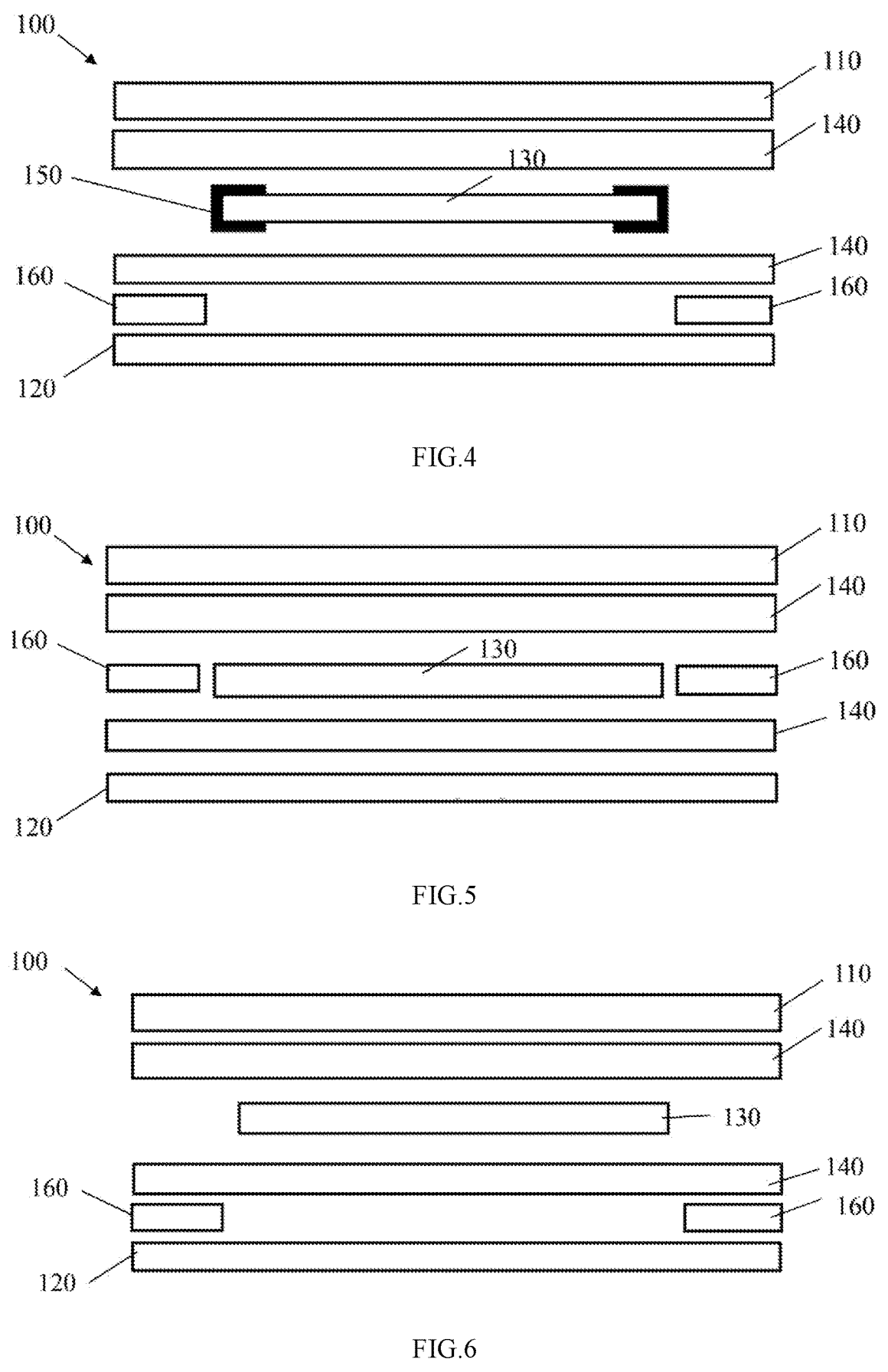

The embodiment shown in FIGS. 2-6 describes the laminated structure of the glass obtained by arranging the frame layer in different positions, in which the same reference numerals indicate the same structural components. In the embodiment of FIG. 2, the frame layer 160 is arranged between the intermediate layers, and the arrangement of the edge-sealing material 150 is adapted to the shape of the frame layer 160. In the embodiment shown in FIG. 3, the frame layer 160 is on the same layer as the light-adjusting layer 130, and the edge-sealing material 150 is arranged to cover the edge of the light-adjusting layer. In the embodiment shown in FIG. 4, the frame layer 160 is between the adhesive layer and the second glass layer, and the edge-sealing material 150 is arranged to cover the edge of the light-adjusting layer 130. FIG. 5 and FIG. 6 are schematic views of the embodiments in which the edge-sealing material is omitted, wherein in the embodiment shown in FIG. 5, the frame layer 150 is on the same layer as the light-adjusting layer, while in the embodiment shown in FIG. 6, the frame layer 150 is disposed between the adhesive layer and the second glass layer.

Furthermore, in the embodiment shown in FIG. 1, an infrared reflection layer (not shown) is provided between the first glass layer 110 and the light-adjusting layer 130.

According to the specific application environment, the infrared reflection layer can be made of any suitable material, and can be integrated into the glass 100 by adopting a suitable process as required. The infrared reflection layer is used to improve the thermal comfort in the vehicle by reflecting light and/or heat radiation, thereby providing the thermal comfort function.

In addition, in the embodiment shown in FIG. 1, a low radiation layer (not shown) is provided on the fourth surface 124 of the second glass layer 120. In the embodiment containing more pieces of glass, for example, in the embodiment containing 3 and 4 pieces of glass, the low radiation layer may be respectively arranged on the sixth and eighth surfaces.

The infrared reflection layer can be arranged on the second surface of the first glass layer in the form of a plating layer or a coating layer.

In the embodiment shown in FIG. 1, light-emitting structures (not shown) are provided on the third surface 122 and the fourth surface 124 of the second glass layer 120. The light-emitting structure can be an ink part, a micro-structure, particles and/or a film.

In the embodiment where the light-emitting structure is an ink part, the ink part has an L\* value greater than 58 in the chromaticity space LAB. In another example, the ink part includes titanium oxide. The ink part can be provided on the third or fourth surface of the second glass layer by plating or coating. In some embodiments, the ink part 103 has anti-sticking property, which can prevent it from sticking to the other glass of the two layers of glass that is not coated/applied during bending, sticking to the process equipment, sticking to the mold, and/or sticking to the conveyor belt, etc. In some embodiments, the ink part is compatible with the bending temperature, such as a temperature higher than 600 degrees Celsius. In one embodiment, the ink part may be formed after the glass is made. In another embodiment, the ink part can be sintered with the glass. In addition, according to the specific application requirements, the ink part can provide different colors.

In the embodiment where the light-emitting structure is a micro-structure, a micro-structure is formed on the third or fourth surface, which is configured such that the light reaching the micro-structure can propagate in a predetermined angle range so that the diffusely reflected, scattered and/or refracted light is emitted in a predetermined area. The micro-structure is transparent when the light source is turned off. The predetermined area may include one or more regular shapes and patterns with various irregular shapes. In some embodiments, regular shape may include, but is not limited to, circle, oval, triangle, rectangle, pentagon, pentagon, hexagon, octagon, etc. These shapes can be individually or combined to form various patterns. In some embodiments, the predetermined area may also have irregular shapes of various patterns, such as the outline of animal, tool, plant, sign, etc. In some embodiments, the size of the micro-structure is micron or nanometer. In some embodiments, the micro-structure can be formed by adding and/or subtracting materials. Alternatively, the micro-structure may be formed by reducing material, such as etching.

In the embodiment where the light-emitting structure is particles, the particles may be uniformly or unevenly arranged on the third or fourth surface according to a predetermined rule. In some embodiments, the particles may be transparent, translucent or even opaque. The particles can also be arranged on the second glass layer in any suitable way. For example, a transparent substrate containing fine particles can be applied on the third or fourth surface in the form of a coating layer.

In other embodiments, the light-emitting structure may be configured as a film on the third or fourth surface, which can guide light to be emitted out of the second glass layer in a predetermined area.

Figure 7:
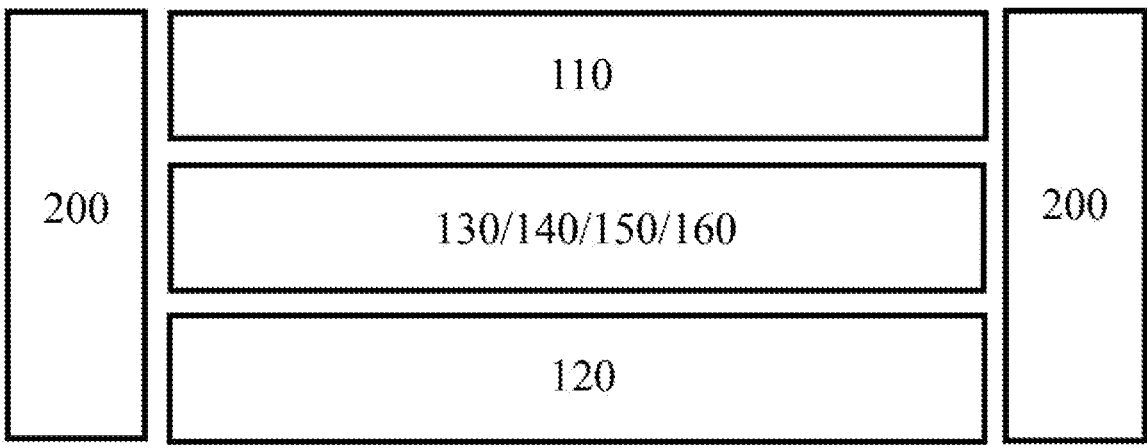
FIGS. 7-8 illustrate simplified schematic views of the combination of the glass assembly and a light source.

In the embodiment shown in FIG. 7, the light source 200 is arranged at the side of the laminated glass 100, so that the light emitted by the light source 200 is incident on the first and/or second glass layers from the edges of the first and/or second glass layers. For example, the light source can be arranged in an invisible area around the glass assembly. The invisible area is the area where the glass assembly is located inside the opaque structure. In some embodiments, the invisible area can also refer to the opaque area of the glass assembly itself.

The light source 200 may be a continuous light source, a linear light source, or a point light source arranged at the edge of the skylight glass, and the light source 200 may be close to or at a predetermined distance from the edge of the skylight glass. The continuous light source refers to a continuous light source arranged at at least one edge of the glass assembly without interruption, while the point light source refers to a point light source arranged near the glass assembly at a certain distance.

Figure 8:
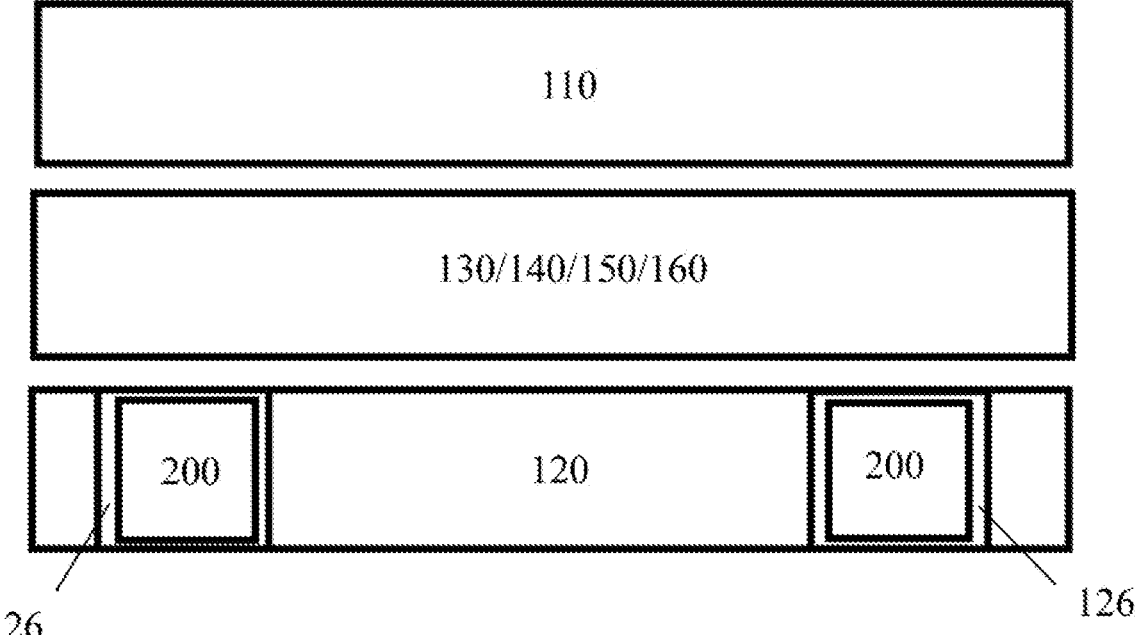

In another embodiment, the first glass layer and/or the second glass layer are provided with a light source hole to accommodate at least a part of the light source, so that the light emitted by the light source can be vertically incident on the first and/or second glass layers. Referring to the embodiment shown in FIG. 8, the second glass layer 120 is provided with a light source hole 126 to accommodate at least a part of the light source 200. The light source hole is configured such that the light source is in the invisible area of the glass assembly, so as to avoid being directly observed. For example, the inner side of the light source hole, that is, the side facing the interior of the vehicle, is blocked by the subsequently added interior trim, while the outer side, that is, the side facing the exterior of the vehicle, is blocked by the ink part. Therefore, the light emitted by the light source can only be emitted out of the glass assembly through the ink part.

Integrating the light source 200 into the glass assembly 100 will further improve the integration of the glass assembly. In some embodiments, the light source hole 126 may be machined to fit the shape of the light source 200. For example, in some embodiments, the light source hole may have a long strip shape, so as to accommodate a continuous light source. In some alternative embodiments, the light source hole may also be a circular hole for accommodating a point light source. The circle here refers to the shape of the cross section of the light source hole parallel to the surface of the first or second glass layer. In addition to the circle, the shape of the cross section of the light source hole parallel to the surface of the glass body includes, but is not limited to, circle, ellipse, strip, triangle, rectangle, pentagon, pentagram, hexagon and octagon, etc.

It should be understood that the above detailed embodiments of the present disclosure are only to illustrate or explain the principles of the present disclosure, but not to limit the present disclosure. Therefore, any modification, equivalent substitution and improvement made within the spirit and principle of this disclosure should be included in the protection scope of this disclosure. Meanwhile, the appended claims of the present disclosure are intended to cover all changes and modifications that fall within the scope and boundaries of equivalent alternatives of the claims.

The invention claimed is:

1. A glass assembly comprising:

a first glass layer comprising a first surface facing an exterior of a vehicle and a second surface opposite to the first surface;

a second glass layer comprising a third surface and a fourth surface opposite to the third surface, the fourth surface facing an interior of the vehicle, and a light-adjusting layer between the first glass layer and the second glass layer, wherein the glass assembly further comprises a light-emitting structure on the third surface or the fourth surface of the second glass layer, and wherein the second glass layer is used for reflecting incident light emitted by a light source and emitting the light into the interior of the vehicle through the light-emitting structure.

2. The glass assembly according to claim 1, wherein an intermediate layer is arranged between the first glass layer and the second glass layer, and the light-adjusting layer is arranged in the intermediate layer.

3. The glass assembly according to claim 1, wherein the light source is adapted to emit the light on the first glass layer and/or the second glass layer from an edge of the first glass layer and/or the second glass layer or vertical to the first glass layer and/or the second glass layer.

4. The glass assembly according to claim 1, wherein the light-adjusting layer comprises at least one of a polymer dispersed liquid crystal, a suspended particle device, an electrochromic layer, a thermochromic layer, a photochromic layer or a liquid crystal layer.

5. The glass assembly according to claim 1, wherein the light-adjusting layer comprises a coating layer.

6. The glass assembly according to claim 1, wherein the light-emitting structure comprises an ink part, a micro-structure, particles and/or a film.

7. The glass assembly according to claim 6, wherein the ink part has an L* value greater than 58 in the chromaticity space LAB.

8. The glass assembly according to claim 6, wherein the ink part comprises titanium oxide.

9. The glass assembly according to claim 1, wherein the first glass layer and/or the second glass layer are provided with a light source hole for receiving at least a part of the light source.

10. The glass assembly according to claim 9, wherein the light source hole is formed such that the light source received in the light source hole is arranged in an invisible area of the glass assembly.

11. The glass assembly according to claim 1, further comprising an infrared reflection layer between the first glass layer and the light-adjusting layer.

12. The glass assembly according to claim 1, further comprising a low radiation layer arranged on the fourth surface of the second glass layer.

13. The glass assembly according to claim 1, further comprising a frame structure.

14. The glass assembly according to claim 1, further comprising an edge-sealing material arranged at an edge of the light-adjusting layer for sealing the light-adjusting layer.

* * * * *